United States Patent [19]

Kanazawa et al.

[11] Patent Number: 4,881,613

[45] Date of Patent: Nov. 21, 1989

[54] FOUR-WHEEL STEERING APPARATUS FOR VEHICLE

[75] Inventors: Hirotaka Kanazawa, Hiroshima; Koushun Note, Higashhiroshima; Yasuhiro Nakashima, Hiroshima, all of Japan

[73] Assignee: Mazda Motor Corporation, Hiroshima, Japan

[21] Appl. No.: 184,984

[22] Filed: Apr. 22, 1988

[30] Foreign Application Priority Data

Apr. 23, 1987 [JP] Japan .................. 62-102775

[51] Int. Cl.[4] .................................... B62D 5/06
[52] U.S. Cl. ..................... 180/140; 123/339; 180/69.3
[58] Field of Search ........... 180/140, 132, 141, 142, 180/143, 69.3; 280/91; 60/431; 123/339, 352

[56] References Cited

U.S. PATENT DOCUMENTS

| | | | |
|---|---|---|---|
| 3,556,243 | 1/1971 | Susag | 180/140 |
| 4,520,777 | 6/1985 | Hatori | 123/339 |
| 4,534,707 | 8/1985 | Mitchell | 60/431 |
| 4,545,449 | 10/1985 | Fujiwara | 123/339 |
| 4,549,400 | 10/1985 | King | 60/431 |
| 4,586,581 | 5/1986 | Shibahata | 180/143 |
| 4,601,357 | 7/1986 | Miyoshi | 180/140 |
| 4,724,810 | 2/1988 | Poirier | 123/339 |
| 4,732,231 | 3/1988 | Kanazawa | 180/140 |
| 4,748,951 | 6/1988 | Manaka | 123/339 |

FOREIGN PATENT DOCUMENTS

83248  4/1987  Japan .................. 280/91

Primary Examiner—John A. Pekar
Attorney, Agent, or Firm—Fleit, Jacobson, Cohn, Price, Holman & Stern

[57] ABSTRACT

A vehicle four-wheel steering apparatus including a manually operated steering member and front and rear wheel steering mechanisms coupled with the steering member for producing steering movements in the vehicle front and rear wheels. The rear wheel steering mechanism includes a power assist actuated by an oil pump driven by the vehicle engine. A return spring returns the rear wheels to a neutral position when the power assist is off. A steering condition detector detects the condition of the rear steering mechanism. An engine output power increase mechanism increases the engine output power responsive to a control signal for increasing the engine output power when the rear steering mechanism is actuated.

12 Claims, 7 Drawing Sheets

| SW66 | SW64 | SW65 | $Q_L$ (g/sec) |
|------|------|------|---------------|
| OFF  | OFF  | OFF  | 0             |
| ON   | ON   | OFF  | 0.5 ($Q_1$)   |
| ON   | ON   | ON   | 1.3 ($Q_2$)   |
| ON   | OFF  | OFF  | 0.3 ($Q_3$)   |

FOUR-WHEEL STEERING APPARATUS FOR VEHICLE

BACKGROUND OF THE INVENTION

1. Field of the Invention

The present invention relates to a four-wheel steering apparatus for vehicles, and more particularly to a four-wheel steering apparatus for vehicles adapted to change a turning ratio of the rear wheels to the front wheels.

2. Description of the Prior Art

A known four-wheel steering apparatus for a vehicle is designed to turn the rear wheels in association with the front wheels in response to the operation of a steering wheel by an operator. The system includes a front wheel turning mechanism and a rear wheel turning mechanism. The steering angle of the steering wheel is arranged to be transmitted through both turning mechanisms to the front wheels and the rear wheels as a turning angle.

In the known four-wheel steering apparatus, a turning ratio of the rear wheels to the front wheels (that is, a ratio of a turning angle of the rear wheels to that of the front wheels) is not always constant and is commonly variable on the basis of a predetermined turning ratio characteristic. The turning ratio characteristic may be set using a running state of the vehicle as a parameter. The parameters may include, for instance, a vehicle speed, the steering angle of a steering wheel, and a transverse G (an acceleration in the transverse direction) acting on the vehicle.

The direction in which the rear wheels are turned may be determined by a so-called same phase direction and a so-called reverse phase direction.

In the known four-wheel steering apparatus, when vehicle speed is low or a steering angle of the steering wheel is large, the rear wheels are turned in reverse phase direction so as to obtain an improved turning rate. Under high vehicle speed or a small steering angle, the rear wheels are turned in same phase direction so as to obtain an improved maneuverability of the vehicle. It has further been proposed in such four-wheel steering apparatus to provide a power-assisted steering mechanism for steering the rear wheels. For example, Japanese Utility Model Public Disclosure No. 57087/1986 discloses a vehicle four-wheel steering apparatus having a front power-assisted steering mechanism for steering front wheels, and a rear power-assisted steering mechanism for steering the rear wheels. Hydraulic oil passages connected with a hydraulic pump driven by the vehicle engine are connected to both front and rear power-assisted steering mechanisms.

On the other hand, Japanese Patent Public Disclosure No. 77570/1986 discloses a vehicle four-wheel steering apparatus having a rear power-assisted mechanism provided with a return spring in order to urge a steering rod to a neutral position.

In general, in a known four-wheel steering apparatus, when hydraulic oil pressure between an oil pump driven by the vehicle engine and a power-assisted steering mechanism is high, output power of the engine is controlled to increase lower hydraulic oil pressure to prevent engine stoppage.

In the four-wheel steering apparatus described above, a problem may arise under idling conditions due to the rear power-assisted steering mechanism.

SUMMARY OF THE INVENTION

It is, therefore, an object of the present invention to provide a four-wheel steering apparatus having a power-assisted rear wheel steering mechanism that includes means for increasing engine output power in accordance with the increase of engine load resulting from the power-assisted rear wheel mechanism.

A further object of the present invention is to control the engine output power more accurately.

The above is accomplished by the present invention by Providing a vehicle four-wheel steering apparatus comprising a manually operated steering member, front wheel steering means coupled with the steering member for producing steering movements in vehicle front wheels in accordance with movements in the steering member, rear wheel steering means for producing steering movements in vehicle rear wheels in accordance with the movements in the steering member, the rear wheel steering means including rear wheel steering rod means adapted for movement substantially transversely of the vehicle and connected with the vehicle rear wheels for producing steering movement therein, a power assist means connected with the steering means actuated by an oil pump driven by the vehicle engine and a return means for returning the rear wheel to a neutral position. The apparatus further comprises a steering condition detecting means for detecting the condition of the rear steering mechanism, an engine output power increasing means for increasing the engine output power, a control means for outputting an engine output power increasing signal to the engine output power increasing means when the rear steering mechanism is steered.

DETAILED DESCRIPTION OF THE PREFERRED EMBODIMENT

Embodiments of the present invention will be described more in detail with reference to drawings attached hereto.

Figure 1:
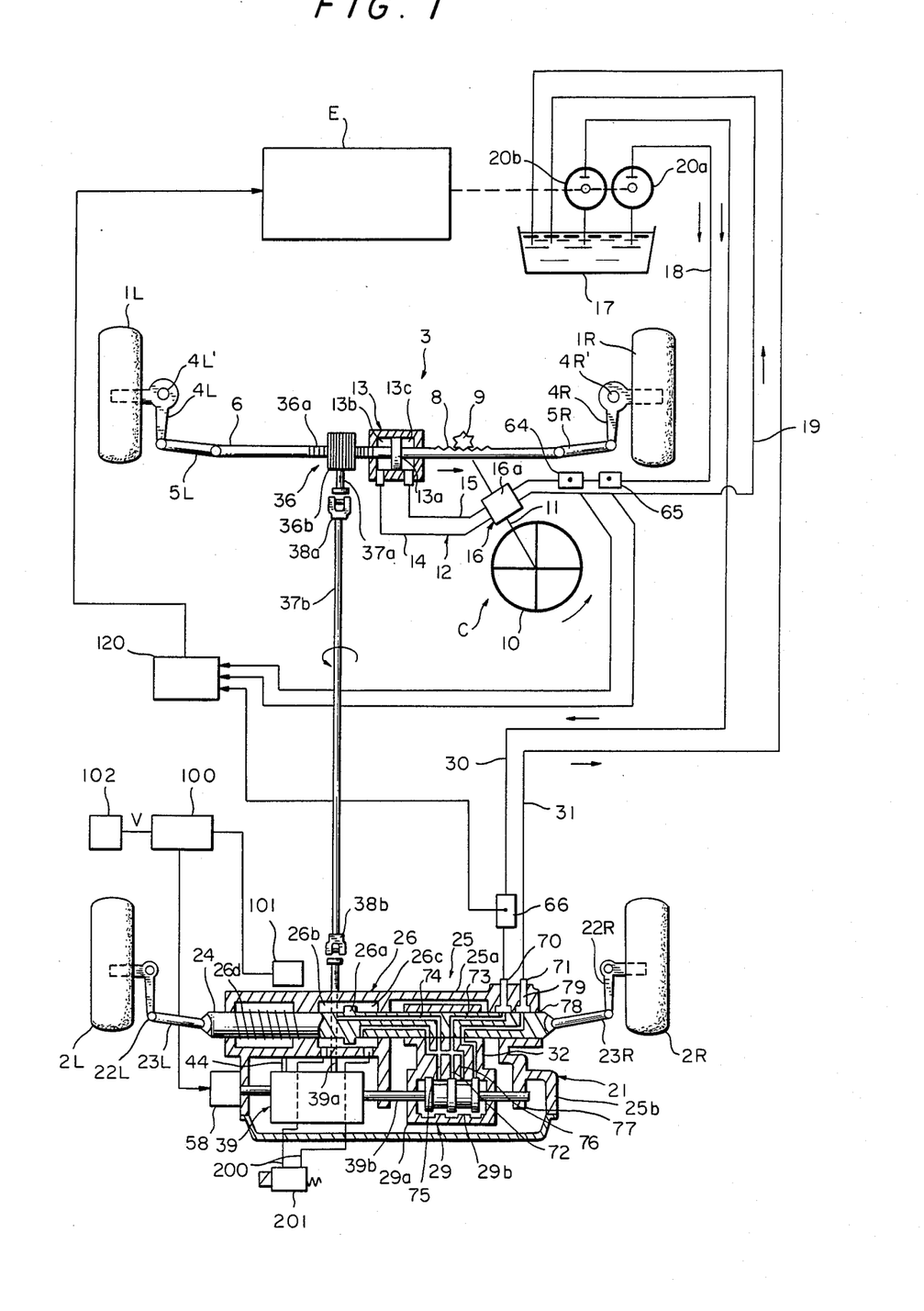
FIG. 1 is a plan view partly in schematic of a vehicle four-wheel steering system in accordance with one embodiment of the preset invention.

In FIG. 1, reference numerals 1R and 1L denote right and left front wheels, respectively, and reference numerals 2R and 2L denote right and left rear wheels, respectively. The right and left front wheels 1R, 1L are associated with a front wheel turning mechanism 3, and the right and left rear wheels 2R, 2L are associated with a rear wheel turning mechanism 21.

In the illustrated embodiment, the front wheel turning mechanism 3 is composed of right and left knuckle arms 4R and 4L, and a steering rod 6 that interconnects the right and left tie rods 5R and 5L. The front mechanism turning mechanism 3 is associated with a steering mechanism that is of a rack-and-pinion type in this particular embodiment. That is, the steering rod 6 is provided with a rack 8 so as to be in mesh with a pinion 9 that, in turn, is connected through a shaft 11 to a steering wheel 10. When the steering wheel 10 is turned right, on the one hand, the relay rod 6 is moved left in FIG. 1 to clockwise rotate the right and left knuckle arms 4R and 4L about their respective pivotal centers 4R' and 4L', thereby turning the front wheels 1R, 1L in the clockwise direction by an amount corresponding to a turning angle of the steering wheel 10. When the steering wheel 10 is turned left, on the other hand, the front wheels 1R and 1L are turned in the counterclockwise direction in accordance with an amount corresponding turning angle of the steering wheel 10 in a similar manner.

The rear wheel turning mechanism 21 is composed of right and left knuckle arms 22R and 22L, right and left tie rods 23R and 23L, and a steering rod 24 that interconnects the tie rods 23R and 23L. In this embodiment, the rear wheel steering mechanism includes a power assist mechanism 25 having a housing which is partly constituted by a cylindrical casing 25a. In the casing 25a, the rear wheel steering rod 24 which extends through the casing 25a and has its opposite ends connected through tie rods 23R and 23L with knuckle arms 22R and 22L, respectively. It will be understood that with the arrangement described above, right and left movements of the steering rod 24 will produce steering movement in the rear wheels 2R and 2L.

The casing 25a is formed with a power cylinder 26 encircling the steering rod 24 which is provided with a piston 26a dividing the interior space of the power cylinder 26 into hydraulic chambers 26b and 26c. The rear wheel-steering mechanism 21 further includes a control unit 39 having an input shaft 39a and an output shaft 39b which may be referred to as a control rod 40 in FIG. 2. The output shaft 39b is located to extend in parallel with the steering rod 24.

There is a second rack-and-pinion mechanism 36 comprised of a rack 36a provided on the front wheel steering rod 6 and a pinion 36b. The second rack-and-pinion mechanism 36 is connected through connecting rod 37a, a universal joint 38a, a connecting rod 37b, and a universal joint 38b with the input shaft 39a so that an axial or longitudinal movement of the steering rod 6 is converted into a rotation of the connecting rod 37a, 37b and transmitted to the input shaft 39a of the control unit 39. A pulse motor 58 is provided on the control-unit 39 to adjust the steering ratio which is defined as a ratio of the steering angle of the rear wheels 2R, 2L to the steered angle of the front wheels 1R, 1L. The motor 58 is connected with a control circuit 100 which receives a vehicle speed signal from a speed detector 102 so that the rotation of the motor 58 is controlled in accordance with the vehicle speed to thereby control the steering ratio. In FIG. 1, it will be noted that a casing 25a is further formed integrally with the casing 25b. In the casing 25b, there is provided a hydraulic control valve device 29 for controlling a supply of hydraulic pressure to and from the power cylinder 26. The control valve device 29 includes a valve casing 29a which is connected with the rear wheel steering rod 24 through an interconnecting section 32. In the valve casing 29a, there is a valve spool 29b which is connected at one end with the output shaft 39b so that it is moved by the output shaft 39b in the direction parallel with the steering rod 24. In order to control the hydraulic fluid supply to and from the hydraulic control valve device 29 and the power cylinder 26, the casing 25a and the steering rod 24 are formed with hydraulic oil passages.

As shown in FIG. 1, there is provided a hydraulic oil reservoir 17, a front hydraulic pump 20a and a rear hydraulic pump 20b driven by engine E of the vehicle. The pumps draw oil from the reservoir 17. The pump 20b has an outlet port which is connected through a conduit 30 into a passage 70. The passage 70 is in communication with a passage 71 in the rear wheel steering rod 24 the passage 71 being in turn connected with a passage 72 which heads to the control valve device 29 at a valve chamber in the valve casing 29a. The hydraulic oil chambers 26b and 26c in the power cylinder 26 are connected, respectively, through passages 73 and 74 in the steering rod 24 and passage 75 and 76. A passage 77 is connected, on one hand, with the valve chamber and, on the other hand, with a passage 78 which is formed in the steering rod 24 and connected through a passage 79 and a conduit 31 with the oil reservoir 17 for providing a return passage.

The front wheel turning mechanism 3, like the rear wheel turning mechanism 21, is provided with a power-assisted mechanism 12 that includes a cylinder 13 mounted on the steering rod 6 of the front wheel turning mechanism 3, cylinder 13 being fixed to the vehicle body. A piston 13a is integrated to the steering rod 6 so as to divide the cylinder 13 into a pair of compartments 13b and 13c.

The compartments 13b and 13c in the cylinder 13 are connected through the respective pipe 14 and 15 to a control valve 16 of the relative type mounted on the shaft 11 of the front wheel turning mechanism 3. The control valve 16 is connected to a pipe 18 which is connected to the output side of the oil pump 20a, also driven by engine E. A pipe 19 is provided for return of oil to the reservoir 17.

In the rear wheel turning mechanism 21, there is provided a return spring 26d so as to urge the steering rod 24 to a neutral position.

Figure 2:
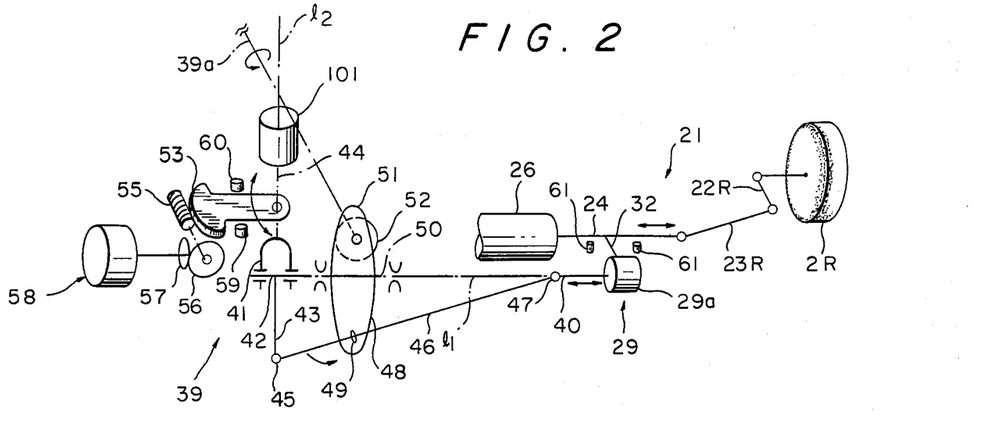
FIG. 2 is a schematic illustrating a portion of a turning ratio changing mechanism.

An example of the control unit 39 will be described with reference to FIG. 2. In the control unit 39, the control rod 40 is supported so as to move slidably in the transverse direction of the vehicle body along a line $l_1$, in FIG. 2. The control unit 39 includes a swinging arm 43 that is supported at its base portion for pivotal movement by a pin 47 with respect to a holder 41. The holder 41 is supported on the vehicle body so as to be rotatable about a line $l_2$ perpendicular to the line $l_1$ along which the control rod 40 is movable. The pin 42 is positioned at the intersection of the lines $l_1$ and $l_2$ and extends in the direction perpendicular to the line $l_2$. Accordingly, although the swinging arm 43 is able to swing about the pin 42, the rotation of the holder 41 varies an angle of inclination of the pin 42 with respect to a plane (reference plane) perpendicular to the line $l_1$. The front end position of the swinging arm 43 is connected with the control rod 40 by bay of a connecting rod 46. Specifically, the connecting rod 46 is connected through a ball joint 45 to the front end portion of the swinging arm 43, on the one hand, and through a ball joint 47 to the control rod 40, on the other hand.

The distance between the ball joints 45 and 47 positioned at each of the end portions of the swinging arm 43 is kept constant by the connecting rod 46. Therefore, when the ball joint 45 is moved in the left and right directions in FIG. 2, the control rod 40 is also moved in the left-and-right direction in FIG. 2 in accordance with the movement of the ball 45 (47).

Swinging movement of the swinging arm 43 about the pin 42 is made according to the movement of operation of the steering mechanism 3, i.e., to the turning angle of the steering wheel 10. For this purpose, in this embodiment, the connecting rod 46 is connected with a rotary plate 48 composed of a bevel gear. The rotary plate 48 is supported rotatively on the vehicle body so as to allow the rotary axis 50 thereof to coincide with the line $l_1$. The connecting rod 46 penetrates slidably an eccentric portion of the rotary plate 48 by way of a ball joint 49, and the rotary plate 48 composed of the bevel gear is in mesh with a bevel gear 52 that in turn is connected to the input shaft 39a.

The swinging arm 43 is swung by the rotary plate 48 about the pin 42 by an amount corresponding to the turning angle of the steering wheel. When the axis of the pin 42 inclines against the line $l_1$, the ball joint 45 moves in the right-and-left direction in FIG. 2, i.e., toward the line $l_1$ in response to the pivotal movement about the pin 42 and this movement is transmitted through the connecting rod 46 to the control rod 40, thereby leading to the movement of the control rod 40. The movement of the ball joint 45 in the right-and-left direction in FIG. 2 is changed to change a turning ratio when an angle of inclination of the pin 42, that is, an angle of rotation of the holder 41, is changed, even if an angle of a swinging movement of the swinging arm 43 about the pin 42 is identical.

In order to change the angle of inclination, a sector gear 53 is fixedly mounted as a worm wheel on the rotary shaft 44 of the holder 41 and is in mesh with a worm gear 55 that is rotatively driven by a stepping motor 58 as inclination angle changing means by way of a pair of bevel gears 56 and 57.

The sector gear 53 driven by the stepping motor 58 is arranged so as to cause both ends of swinging strokes to be controlled by a stopper 60 at the same phase part and a stopper 59 at the reverse phase part, respectively. A rod stopper 61 is provided for limiting the maximum movable range of the steering rod 24.

The following description concerns the swinging angle of the swinging arm 43 about the pin 42 and the angle of inclination of the swinging arm 42 (the angle of inclination of the pin 42) on the movement of the ball joint 45 in the direction of the line $l_1$. In the following description, the swinging angle of the swinging arm 43 about the pin 42 is represented by $\theta$. The reference plane perpendicular to the line $l_1$ is represented by $\delta$. The angle of inclination of the swinging plane of the swinging arm 46 with respect to the reference plane $\delta$ is represented by $\alpha$, and the eccentric distance of the ball joint 45 from the pin 42 is represented by $\gamma$. In this case, the amount of movement X of the ball joint 45 in the direction of the line $l_1$ is represented by the formula: $X = \gamma \tan \alpha \sin \theta$ and is a function of $\alpha$ and $\theta$. Accordingly, when the angle $\alpha$ of inclination is fixed at a particular value, on the one hand, the amount of movement X depends solely upon the function of $\theta$ or the turning angle of the steering wheel. When the angle $\alpha$ of inclination is changed, on the other hand, the amount of movement X is changed even if the turning angle of the steering wheel is identical. In other words, the change of the angle $\alpha$ of inclination leads to the change of turning ratios. Therefore, an angle of revolution of the stepping motor 58 (step numbers) corresponds primarily with the turning ratio.

The mechanism of changing tuning ratios itself is disclosed in U.S. Pat. No. 4,572,316. A description thereof will accordingly be omitted here.

Figure 3:
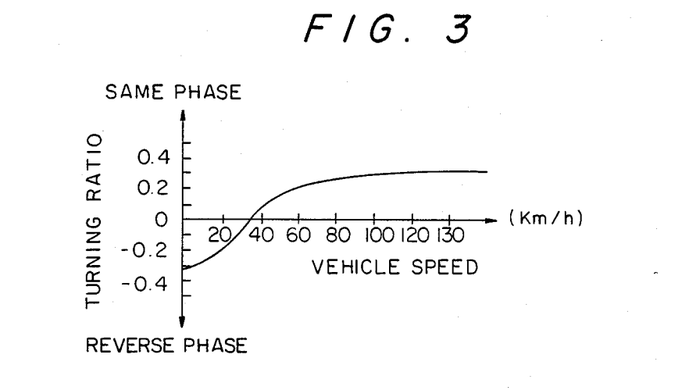
FIGS. 3 and 4 are graphs illustrating variations in turning ratio characteristics.

The turning ratios may be changed on the basis of turning ratio characteristics predetermined using a vehicle speed as a parameter, for instance, as shown in FIG. 3.

Figure 4:
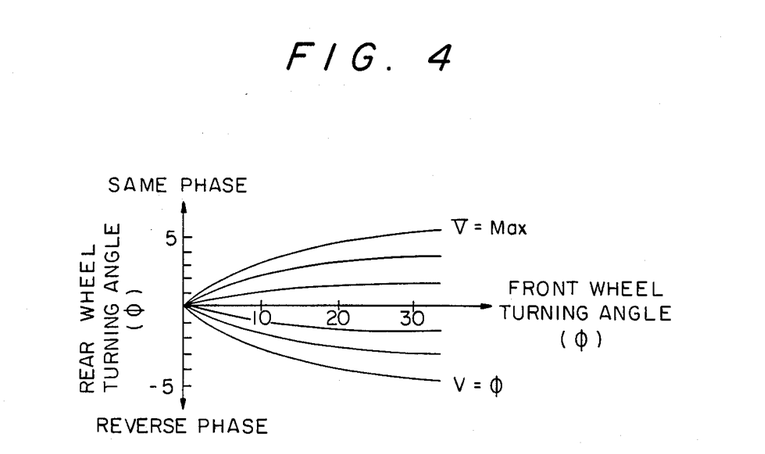

FIG. 4 shows the relationship of a rear wheel turning with a front wheel turning angle as a replacement of the turning ratio characteristics indicated in FIG. 3.

Referring to FIG. 3, under a low vehicle speed, the rear wheels are steered in the reverse phase direction so as to obtain an improved turning rate. At the vehicle speed of 35 Km/h, the steering rate becomes zero so that the rear wheels are not steered. Under a high vehicle speed, the rear wheels are steered in the same phase direction so that the road grip of the wheels under cornering will be improved. The control unit 39 is adjusted so that the steering ratio is controlled in accordance with the vehicle speed in the manner as shown in FIG. 3. In order to protect the steering ratio detector 101 from foreign articles, it is located above the rear wheel steering rod 24.

Figure 5:
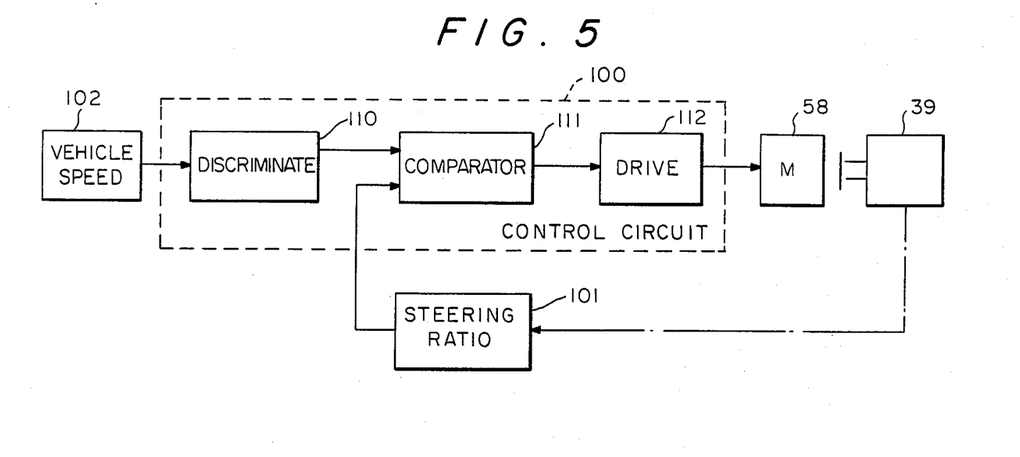
FIG. 5 is a block diagram showing a control for changing the steering angle ratio.

Referring to FIG. 5, there is shown an example of the control circuit 100 for controlling the stopping motor 58 to thereby control the steering ratio. The circuit 100 includes a discriminating circuit 110 which receives a vehicle speed signal from the speed detector 102. The discriminating circuit 110 has an output connected with a comparator 111 of which output is connected with a drive circuit 112. The comparator 111 further receives a steering ratio signal from the detector 101 and compares the signal from the discriminating circuit 110 with the steering ratio signal. The driving circuit 112 receives the output of the comparator 111 and produces a motor driving signal.

Figure 14A:
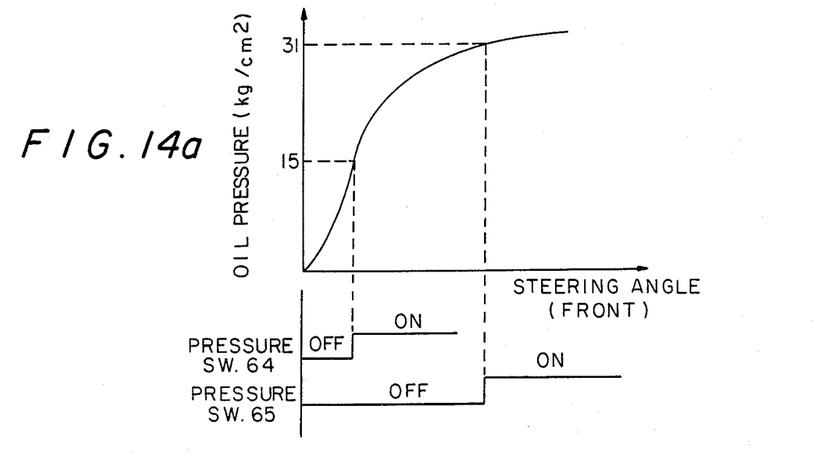
FIGS. 14a and 14b show the working point of the pressure switches of the present invention.
Figure 14B:
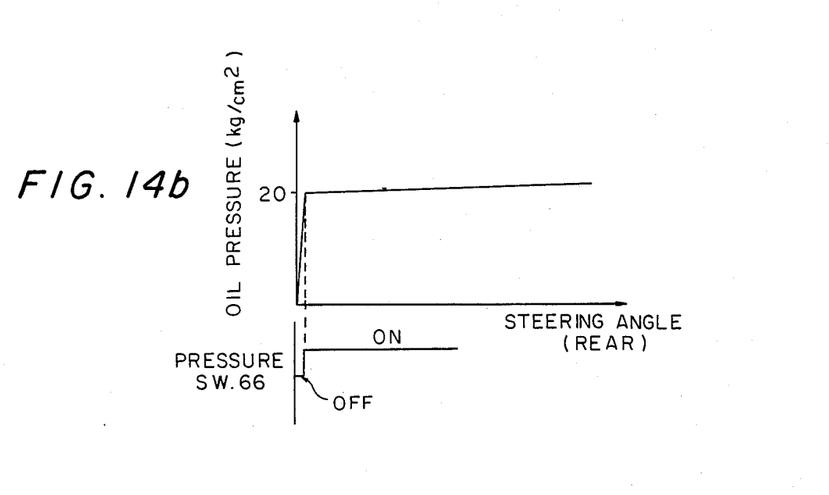
Figure 15A:
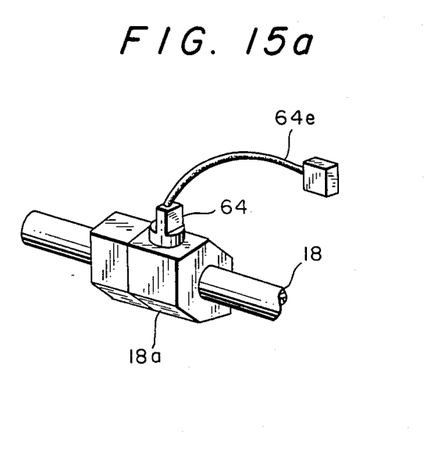
FIGS. 15a and 15b show the pressure switch.
Figure 15B:
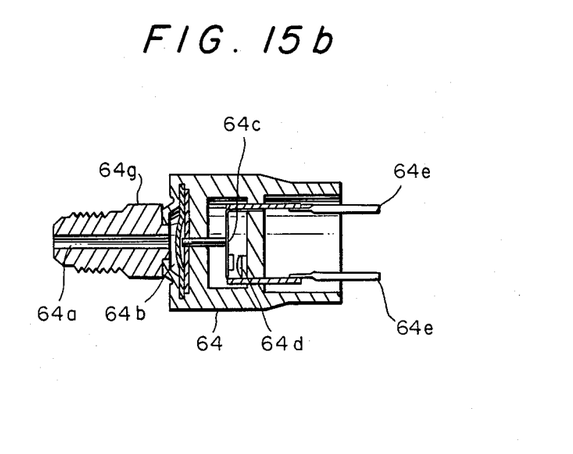

Turning now back to FIG. 1 the chambers 26b, 26c of the rear wheel steering mechanism 21 are connected to each other through passages 200 that in turn are connected with an electromagnetic on-off valve 201. When the on-off valve 201 is closed, the rear wheels 2R and 2L can be turned against the force of the spring 26d. When the on-off valve 201 is open so as to keep the pressures in the chambers 26b and 26c identical to each other, the rear wheel 2R and 2L are forced to their neutral position by the action of the spring 26d. It is a matter of course that an urging force of the spring 26d should be predetermined to be large enough to be kept at the neutral position opposite to the outside force given by the rear wheel 2R and 2L, while cornering turning of the steering wheel will change the engine load from the hydraulic pumps 20a, 20b, as shown in FIGS. 14a and 14b. FIG. 14a shows engine load resulting from the hydraulic pump 20a as steering angle of the front wheel increases. FIG. 14b shows engine load resulting from the hydraulic pump 20b as steering angle of the rear wheels increases. The pressure of the front power-assisted mechanism 13 is detected by pressure switches 64, 65. FIG. 15a and 15b show details of pressure switch 64. The pressure switch 64 is connected to a connecting member 18a of the pipe 18, as shown in FIG. 15a. An electric wire pair 64e is connected to the pressure switch 64. The electric wire 64e is connected to the control unit 120. As shown in FIG. 15b, the pressure switch 64 has a threaded protection 64g having passage 64a. Projection 64g is threaded into member 18a so that passage 64a is exposed to the interior of the pipe 18. A diaphragm 64b is provided in the pressure switch 64 facing to the passage 64a. A first switch contact 64c is mounted on a resilient strip provided with a post that lies adjacent diaphragm 64b. A second switch contact 64d is mounted on the housing of the pressure switch 64. The pair of wires 64e are connected, respectively, to contacts 64c and 64d. When the diaphragm 64b moves to the right direction, as seen in FIG. 15b, the contacts will close completely the circuit through wires 64e. This will happen when the pressure force in the passage 64a exceeds a predetermined spring force value composed of the bias of diaphragm 64b and contact 64c. The pressure switches 65 and 66 are of the same construction as the pressure switch 64.

A working point for each pressure switch 64 and 65 is determined as shown in FIG. 14a. The oil pressure that causes the pressure switch 64c to work is determined to detect the pressure of initial steered condition (i.e., a point where the characteristic becomes uniform slope e.g., about 15 kg per cm$^2$ as shown in FIG. 14a). If the operating pressure for the pressure switch 64 is determined higher, the engine E will stop because of overload by the oil pressure pump 20a. Moreover, if the working pressure for the pressure switch 64 is determined lower, the engine output power will become larger than necessary, and fuel consumption will become worse. The oil pressure that causes the pressure switch 65 to work is determined to detect the pressure at a maximum steered condition, e.g., about 31 kg per cm$^2$ as shown in FIG. 14a. This prevents the engine stopping under maximum engine load condition.

The pressure of the rear power-assisted mechanism 25 is detected by a pressure switch 66. The working point of the pressure switch 66 is determined as shown in FIG. 14b. The oil pressure that causes the pressure switch 66 to work is determined as the pressure for holding the return spring 26d in the operating point, e.g., about 21 kg per cm$^2$ as shown in FIG. 14b. In this embodiment, the rear wheels 2R, 2L are steered at not a large angle (i.e., maximum steering angle substantially 5°) so that the characteristics of the rear oil pressure are not overridden by the return spring 26d pressure, as shown in FIG. 14b.

The engine output power is controlled in accordance with the working condition of the pressure switches 64, 65, 66, as described in the following.

Figure 6:
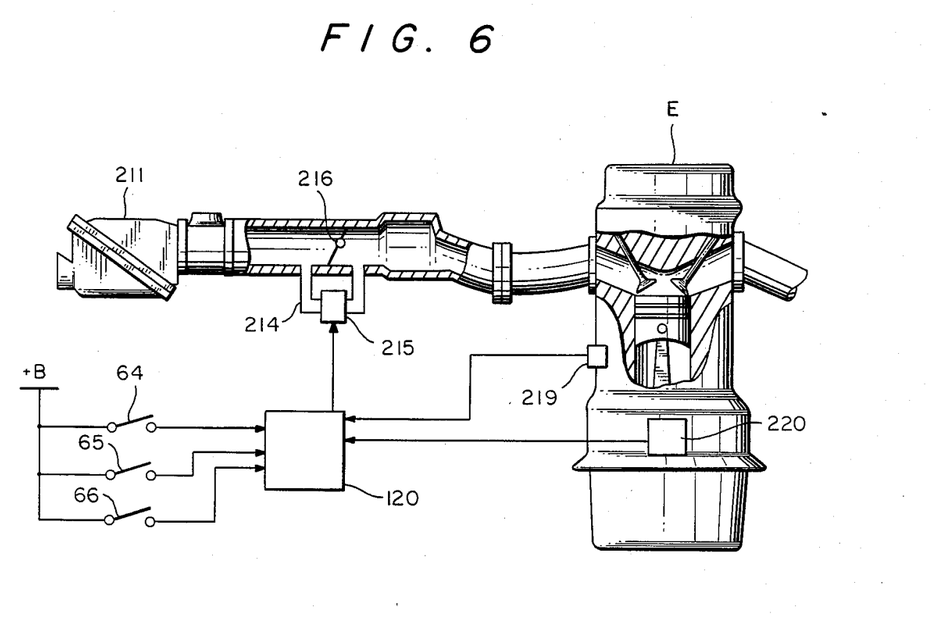
FIG. 6 is a schematic of an engine speed control system in accordance with one embodiment of the present invention.

FIG. 6 shows an engine idle control system. An engine control unit 120 is designed so as to allow signals to be input from oil pressure switches 64, 65, and 66, a sensor 219 for detecting water temperature of an engine, and an engine speed detecting sensor 220. A throttle valve 216 is mounted in an induction passageway providing communication between an air cleaner 211 and the engine E for conducting air thereinto. An air bypassway 214 is provided for bypass of the air flow in the inducting on passageway. An electromagnetic on-off valve 215 is provided in the bypassway 214 for controlling the volume of flowing air the engine control unit 120 is for control of fuel injecting on, ignition timing, and idle speed. The fuel injection and ignition timing control are well known so their description is omitted here.

Idle speed control is provided to compensate the engine output power depending on the increase of the engine load by the front and rear power-assisted steering mechanism 13, 25. Idle speed is controlled by changing the volume of flowing air in the bypassway 214 by the electromagnetic on-off valve 215.

Figure 7:
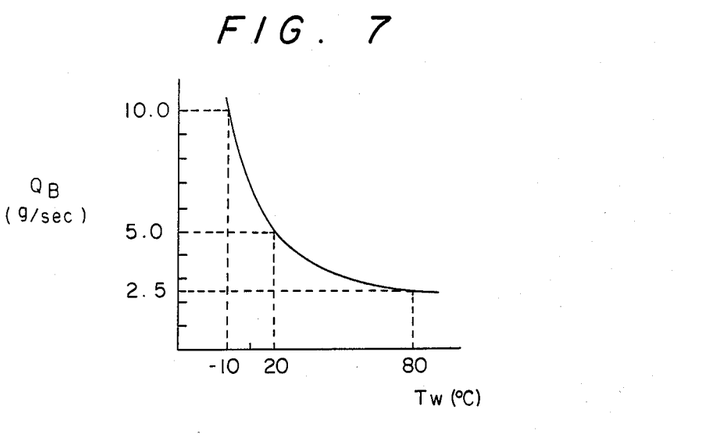
FIGS. 7 to 11 are graphs illustrating characteristics for an engine speed control.
Figure 8:
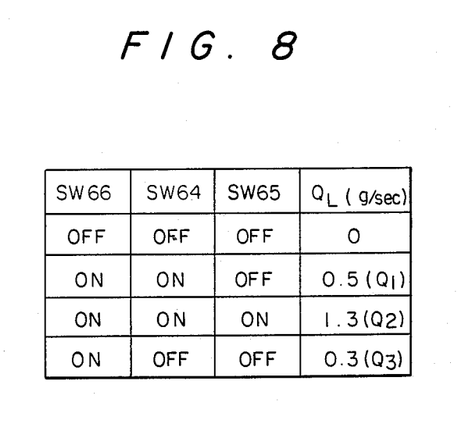
Figure 9:
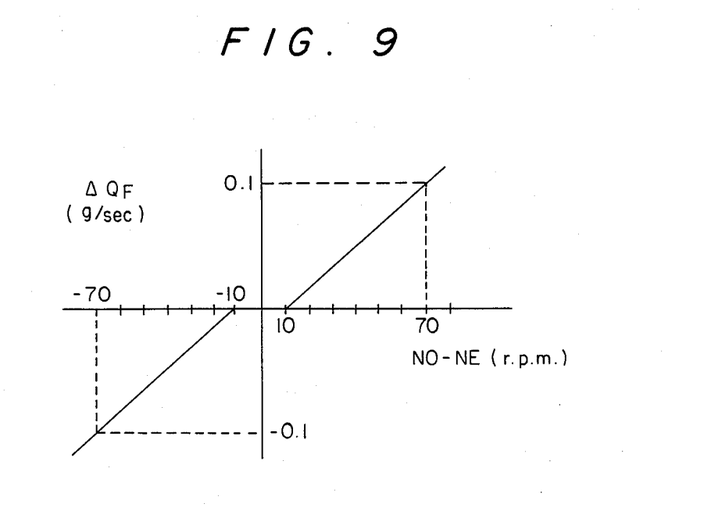
Figure 10:
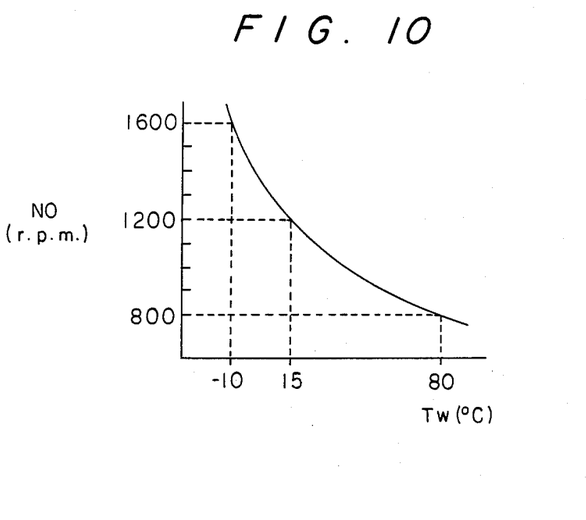
Figure 11:
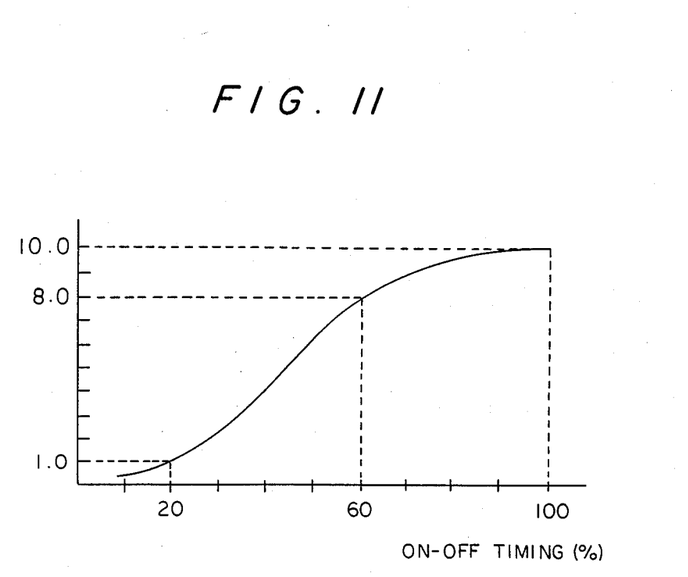

A control signal $Q_{ISC}$ for controlling the volume of flowing air is represented by the formula: $Q_{ISC}=Q_B+Q_L+Q_F$, where $Q_B$ is a foundation of volume of flowing air for idle speed compensation determined by water temperature $T_w$ of the engine. The characteristics of $Q_s$ in g/sec plotted against $T_w$ in °C is shown in FIG. 7. $Q_L^X$ is a volume of flowing air for compensating the engine load by the power-assisted steering mechanism. $Q_L$ in g/sec is determined by a table as shown in FIG. 8. $Q_F$ is a feedback signal from convergence of the engine speed to the target engine speed No. $Q_F$ in g/sec is determined by the characteristics shown in FIG. 9 plotted against engine speed and FIG. 10 which plots target speed No versus engine water temperature $T_w$. The control signal is changed to an ON-OFF timing signal for driving the electromagnetic on-off valve 215. The ON-OFF timing of the on-off valve 215 is determined in accordance with the characteristics shown in FIG. 11.

Figure 12:
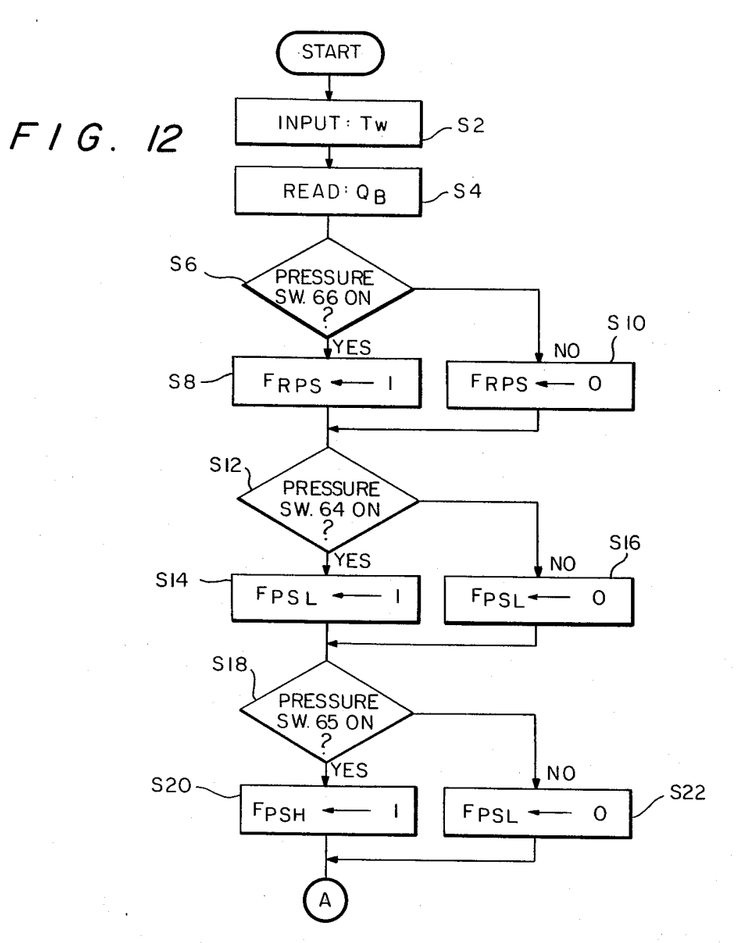
FIGS. 12 and 13 are flow charts illustrating examples of an engine speed control system according to the present invention.
Figure 13:
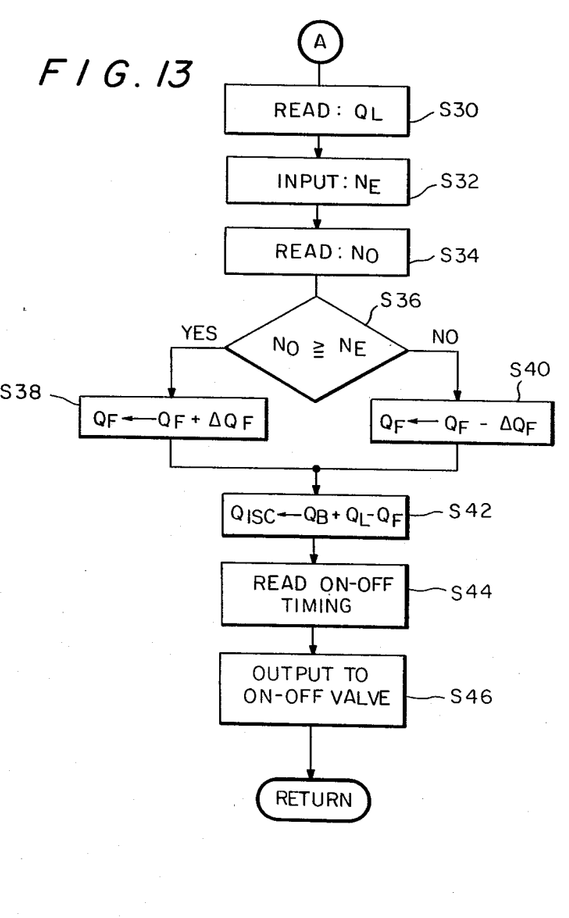

Control by the engine control unit 120 will be described in detail with reference to the flow charts as shown in FIGS. 12 and 13. FIG. 12 is for detecting the engine load conditions by the power-assisted steering mechanism. FIG. 13 is for determining an optimum value of $Q_L$ for compensating the idle speed and for determining the value of $Q_{ISC}$. In the following description, the reference symbol "S" means step. The water temperature $T_w$ of the engine speed is read in S2. The foundation volume of flowing air $Q_B$ is read in S4. $Q_B$ is determined in accordance with the $T_w$ as shown in FIG. 7.

From S6 to S22, the engine load is detected. A signal from the pressure switch 66 is input, and a determination is made whether the pressure switch 66 is working or not in S6. If the pressure switch 66 is working, flag FRPS becomes "1" and, if not working, flag FRPS becomes "0" in S8 and S10. A signal from the pressure switch 64 is input, and a determination is made whether the pressure switch 64 is working or not in S12. If the pressure switch 64 is working, flag FPSL becomes "1" and, if not working, flag FPSL becomes "0" in S14 and S16. A signal from the pressure switch 65 is input, and a determination is made whether the pressure switch 65 is working or not in S18. If the pressure switch 65 is working, flag FPSH becomes "1" and, if not working, flap FPSH becomes "0" in S20 and S22.

As shown in FIG. 13, $Q_L$ is determined in accordance with the working condition of pressure switches 64, 65, and 66 in S30. The value of $Q_L$ is predetermined as:

$$Q_3 \leq Q_1 \leq Q_2$$

in this embodiment.

Engine speed $N_E$ is input in S32, and the target engine speed $N_o$ is read in S34. Target engine speed $N_o$ can be read from FIG. 10 as a parameter of $T_w$. The engine speed $N_E$ and the target engine speed $N_o$ are compared in S36; if $N_o \geq N_e$, $Q_F$ is determined as $Q_F=Q_F+\Delta Q_F$. If $N_o < N_E$, $Q_F$ is determined as $Q_F=Q_F-\Delta Q_F$ in S36, S38, and S40. Here, $Q_F$ is determined based on the value, plus and minus, of the formula $N_o-N_E$ and can be read from FIG. 9. $Q_{ISC}$ is determined in S42, and $Q_{ISC}$ is changed to an ON-OFF timing signal which can be read from FIG. 11 in S44. The ON-OFF timing signal is output to the electromagnetic on-off valve 215 in S46.

In operation, the controller 100 reads the desired steering angle of the rear wheels based on the vehicle speed signal from the speed sensor 102 to determine the desired rear wheel steering angle. The controller 100 then produces a signal for operating the stepping motor 58 so that the rear wheels are steered in accordance with the steering characteristics as shown in FIG. 3.

The front wheels 1L, 1R are steered by the front power-assisted mechanism 13, which is operated by oil supplied from the oil pump 20a. Especially in the idle condition of the vehicle, if the steering wheel 10 is steered, the front wheels 1L, 1R and rear wheels 21, 2R are steered in the reverse phase direction. Then, if the pressure switch 64 is working, engine speed increases to $Q_1$, as shown in FIG. 8. Incrementing of engine speed as $Q_2$ will prevent engine stopping. Thereafter, if the steering wheel 10 is steered to the maximum steering angle, the pressure switch 65 is working and the engine speed increases to $Q_2$ as shown in FIG. 8. Incrementing of engine speed as $Q_2$ prevents engine stopping in spite of maximum engine load. In the condition of engine speed increase to $Q_1$, if the driver stops turning the steering wheel 10, the pressure of the oil in conduit 18 to the front power-assisted mechanism 13 becomes low, but the pressure of the oil in conduit 30 to the rear power-assisted mechanism 25 still is high because of the return force of the return spring 26d. In this case, the pressure switches 64 and 65 are not working, but the pressure switch 66 continues working so the engine speed increases to $Q_3$ as shown in FIG. 3 and prevents engine stopping.

On the other hand, in the condition of engine speed increased to $Q_2$, if the driver stops turning the steering wheel 10, the pressure of the oil conduit 18 for the front power-assisted mechanism 13 becomes low, but the pressure of the oil conduit 30 for the rear power-assisted mechanism 25 continues to be high oil pressure because of the return force of the return spring 26d. In this case also, the pressure switches 64 and 65 are not working, but the pressure switch 66 continues working so the engine speed increases to $Q_3$ same as the condition of engine speed increasing to $Q_1$ and prevents engine stopping.

From the above description, it will be understood that according to the present invention, the rear oil pressure of rear power-assisted mechanism 25 is provided for the parameter for the engine output power control system. It is, therefore, possible to prevent engine stopping from occurring due to the return spring 26d of the rear power-assisted mechanism 25.

It will be further understood that according to the present invention, the oil pressure of the front power-assisted mechanism 13 is detected at two points. One point is detected at an initial steered condition. The other point is detected at a maximum steered condition. It is, therefore, possible to detect a pressure change exactly so that engine output power will be controlled in detail that at an initial steered condition, the engine output power will increase, but not so much that fuel consumption will become excessive and, at maximum steered condition, the engine will not stop in spite of the maximum engine load.

The invention has thus been shown and described with reference to a specific embodiment; however, it should be noted that the invention is in no way limited to the details of the illustrated arrangement, but changes and modifications may be made without departing from the scope of the appended claims.

We claim:

1. A four-wheel steering apparatus for a vehicle, including:
   a vehicle engine;
   a manually operated steering member for producing steering movements in front and rear wheels of the vehicle through front and rear wheel steering means;
   a first power assist means actuated by an oil pump driven by the vehicle engine included in said front wheel steering means;
   a second power assist means actuated by an oil pump driven by the vehicle engine included in said rear wheel steering means;
   biasing means for returning the rear wheels to a neutral position;
   first oil pressure detecting means for sensing the oil pressure in the first power assist means;
   second oil pressure detecting means for sensing the oil pressure in the second power assist means; and
   control means for increasing engine output power by a first predetermined amount when an oil pressure rise signal from said first oil pressure detecting means is received, and for increasing engine output power by a second predetermined amount which is different from the first predetermined amount when both an oil pressure fall signal from said first oil pressure detecting means and an oil pressure rise signal from said second oil pressure detecting means are received.

2. A four-wheel steering apparatus for a vehicle in accordance with claim 1, wherein said first and second oil pressure detecting means are oil pressure responsive switches.

3. A four-wheel steering apparatus for a vehicle in accordance with claim 2, wherein said first oil pressure detecting means has two oil pressure responsive switches having different actuating pressure levels.

4. A four-wheel steering apparatus for a vehicle in accordance with claim 3, wherein the oil pressure required to actuate one of said two oil pressure responsive switches is substantially equal to the oil pressure indicative of an initial steering condition, and the oil pressure required to actuate the other of said two oil pressure responsive switches is substantially equal to the oil pressure indicative of a maximum steering condition.

5. A four-wheel steering apparatus for a vehicle in accordance with claim 4, wherein said first predetermined amount comprises a third predetermined amount when only an actuating signal from said one of said two oil pressure responsive switches is received, and a fourth predetermined amount larger than the third predetermined amount when actuating signals from both said two oil pressure responsive switches are received.

6. A four-wheel steering apparatus for a vehicle in accordance with claim 5, wherein said second predetermined amount is smaller than the third predetermined amount.

7. A four-wheel steering apparatus for a vehicle in accordance with claim 2, wherein said second oil pressure detecting means is an oil pressure responsive switch requiring higher oil pressure for actuation than the oil pressure required to overcome a force provided by said biasing means.

8. A four-wheel steering apparatus for a vehicle in accordance with claim 1, wherein said rear wheel steering means has a steering rod with ends connected to the rear wheels, said rear wheels steered by said steering rod, and wherein said biasing means is a spring for biasing said steering rod to a neutral position.

9. A four-wheel steering apparatus for a vehicle in accordance with claim 1, wherein each of said front wheel steering means and said rear wheel steering means has an independent oil pump.

10. A four-wheel steering apparatus for a vehicle in accordance with claim 1, wherein said control means increases the engine output power by changing the volume of flowing air in an intake passage of the engine.

11. A four-wheel steering apparatus for a vehicle in accordance with claim 1, wherein said control means increases the engine output power when the engine is in an idle condition.

12. A four-wheel steering apparatus for a vehicle in accordance with claim 1, wherein said control means increases the engine output power by the first predetermined amount when oil pressure rise signals are received from both said first oil pressure detecting means and said second oil pressure detecting means.

* * * * *